United States Patent [19]

Traster

[11] 4,290,063

[45] Sep. 15, 1981

[54] VIDEO DISPLAY TERMINAL HAVING MEANS FOR ALTERING DATA WORDS

[75] Inventor: Elden D. Traster, Garland, Tex.

[73] Assignee: Harris Data Communications, Inc., Dallas, Tex.

[21] Appl. No.: 63,528

[22] Filed: Aug. 3, 1979

[51] Int. Cl.[3] .............. G06F 3/153

[52] U.S. Cl. .............. 340/723; 340/799

[58] Field of Search .............. 340/723, 724, 731, 799

[56] References Cited

U.S. PATENT DOCUMENTS

| | | | |
|---|---|---|---|
| 3,624,632 | 11/1971 | Ophir | 340/799 X |
| 4,117,473 | 9/1978 | Habeger et al. | 340/724 |
| 4,163,229 | 7/1979 | Bodin et al. | 340/799 X |

*Primary Examiner*—David L. Trafton

*Attorney, Agent, or Firm*—Yount & Tarolli

[57] ABSTRACT

A video display terminal is disclosed for use in displaying images of data characters on a display screen. Multi-bit coded data words are supplied by a data source, such as a memory, to a character generator circuit which controls the display of data characters on the face of a video display screen. The coded data words generally fall into three categories; to wit, character codes, control codes and attribute codes. Character codes describe the type of character to be presented on the screen. Attribute codes present modifications or special conditions to be used in conjunction with a displayed character. Control codes are used in conjunction with the control circuitry employed by the character generator. A programmable logic array is interposed between the data source and the character generator and the logic array is programmed so as to interpret the various coded words in various ways to provide output coded words having bit patterns which may be the same or different from that which was inputted from the data source. Consequently, the meaning of an inputted data word may be changed, so that for example, a data word representative of a particular control code may be interpreted to mean a particular character, thereby increasing the available codes to describe characters.

7 Claims, 7 Drawing Figures

VIDEO DISPLAY TERMINAL HAVING MEANS FOR ALTERING DATA WORDS

BACKGROUND AND FIELD OF THE INVENTION

This invention relates to the video display of images and, more particularly, to improvements in increasing the meaning attached to various coded data words outputted from a data source to a character generator so that variations in the number of characters or attributes or control commands can be had.

Whereas the invention is described herein in conjunction with a video display system incorporating a host computer and individual terminals, it is to be appreciated that the invention is not limited thereto but may also be employed in a stand alone video display terminal or other apparatus where it is desirable to vary the meaning of various coded data words supplied to a character generator from a data source.

In a typical video display system a data source supplies multi-bit coded data words to a video display circuit, which includes a character generator, and which in turn controls the display of characters and the like on a video display screen, such as a cathode ray tube. The coded data words fall into three basic categories; to wit, character codes, control codes and attribute codes. Control codes are special commands, such as end of line (EOL) or end of frame (EOF) which command the video control circuitry to take some action in conjunction with controlling the video display. Attribute codes define special conditions in a field of characters following the attribute code, such as reverse video display or blinking and the like. Character codes in a typical video display terminal serve as addresses for addressing a character memory, such as read only memory (ROM) from which dot patterns are obtained for use in controlling the cathode ray tube to form a dot pattern image of the character to be displayed. Each of these multi-bit data words has a bit pattern which is similar in nature. For example, each may be an eight bit word and, hence, coding circuitry or the like is employed to determine whether the coded data word is representative of a character code or a control code or an attribute code. To maximize the number of codes available for describing characters, the first bit of a coded word representative of a character may have a distinctive binary level, such as a binary "0" level. This leaves seven bits to be used for addressing the character memory thereby providing a possibility of 128 addresses to provide a system having a capability of generating 128 different characters. If the most significant bit is a binary 1 level, then the next most significant bit may be either a binary 1 or a binary 0 and dedicated to identify the coded word as either a control code or an attribute code. The least significant six bits of those data words, then, may be used to provide attribute codes or control codes.

Because at least the most significant bit of such a data word is dedicated to describing that word as a character code, then this leaves in that system, a maximum of 128 available codes to describe characters to be displayed. In many applications, this simply is not enough characters and, hence, this limits the use to which such a display terminal may be employed. In examining these data words, it will be determined that in many applications, the maximum number of attributes being requested by an attribute code is limited to six attributes and that, perhaps, as many as only two control codes are required. This is an inefficient use of the data words that are decoded as being attributes codes or control codes since this leaves a possibility of many as 60 available codes in an eight bit system that are not being used at all.

SUMMARY OF THE INVENTION

It is a primary object of the present invention to increase the number of data words which may be used to describe character códes by converting unused attribute words or control words into bit patterns which may be used as character codes.

It is a still further object of the present invention to provide means interposed between a data source and a character generator in a video display terminal so that data words enroute to a character generator may be programmably varied, as desired, to achieve more flexibility in the number of attribute codes or control codes or characters being used in such a system.

It is a still further object of the present invention to programmably vary the bit pattern of a data word so that, for example, an eight bit system may operate as a larger system in terms of the number of data words which may be used to describe attribute codes or control codes or character codes.

In accordance with one aspect of the present invention, a video display system includes a data source that provides a data stream comprised of a plurality of multi-bit coded data words. Each such data word may be representative of a non-character word or a character word to be displayed. The video display means serves to display images of characters representative of the coded character words. The video display means is controlled by a character generator to cause the image represented by a coded character word to be displayed. Interposed between the data source and the character generator, there is provided means for converting the bit patterns of the coded data words in such a manner that the outputted data words to the character generator may have their bit patterns varied in their meaning so as to describe the same or a different type of data word than that represented by the inputted data word.

BRIEF DESCRIPTION OF THE DRAWINGS

The foregoing and other objects and advantages of the invention will become more readily apparent from the following description of the preferred embodiment of the invention as taken in conjunction with the appended drawings wherein.

DETAILED DESCRIPTION

GENERAL DESCRIPTION

Reference is now made to the drawings wherein the showings are for purposes of illustrating a preferred embodiment of the invention only and not for purposes of limiting the same.

Figure 1:
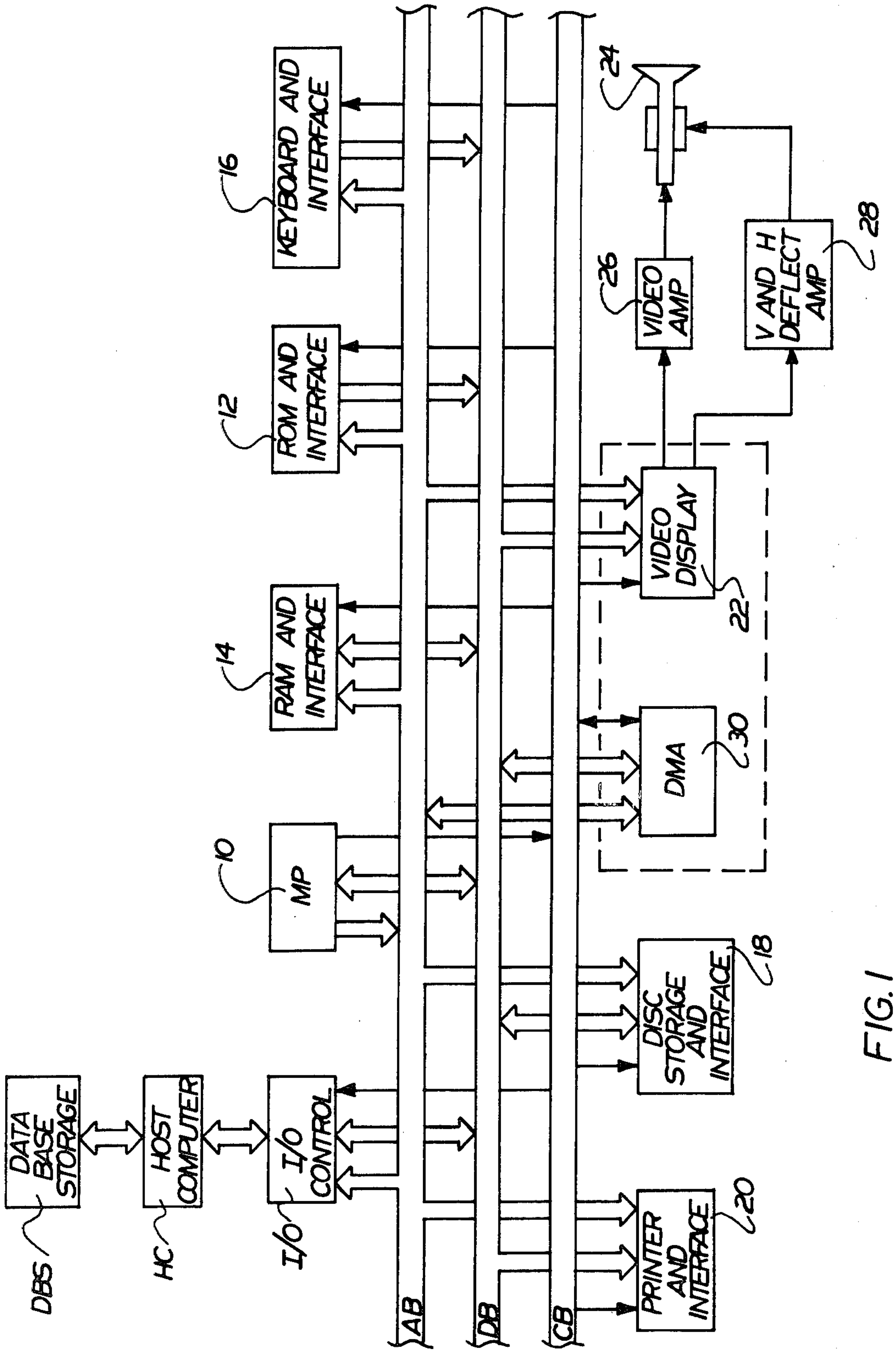
FIG. 1 is a schematic-block diagram illustration of one application of the present invention.

FIG. 1 is a schematic-block diagram illustration of a video display terminal which may interact with a host computer. The terminal is a processor driven terminal employing a common bus structure including an address bus AB, a data bus DB, and a control bus CB. The address bus AB may, for example, be a sixteen bit bus, whereas the data bus may be an eight bit bus. An interface to the host computer HC may be had by way of a suitable input/output control IO. This conventionally includes a universal synchronous, asynchronous receiver transmitter (USART). The input/output control IO communicates in a conventional manner with the address bus, the data bus and the control bus. Also connected to the common bus is a microprocessor 10 and external memories 12 and 14. Memory 12 may store the instruction sets for the processor and may take the form of a read only memory (ROM). Instruction sets are obtained from memory 12 in response to a program counter in the processor placing an address on the address bus AB. Memory 12 then responds by outputting data in the form of an instruction set to the data bus DB in a conventional fashion.

Data to be displayed or otherwise manipulated by the processor is stored in memory 14 and takes the form of a read/write random access memory (RAM). The data stored in memory 14 may be obtained from an input peripheral such as a keyboard 16, the host computer HC, a tape reader or the like, or perhaps a local disc storage such as storage 18. Under program control, data may be outputted to such output peripherals as a conventional printer 20 or by way of the input/output control IO to the host computer HC for storage at the data base storage DBS. Additionally, data to be displayed may be outputted to a video display circuit 22 for subsequent display on the face of a cathode ray tube 24. Suitable amplifying circuits including a video amplifier 26 and a vertical and horizontal deflection amplifier 28 are employed and used in a conventional manner. Data to be fetched from RAM 14 for subsequent display on the cathode ray tube may be accessed by means of a direct memory access circuit 30 of conventional design, such as that known as model AMD9517. Such a memory access circuit serves in response to control signals, as from a character generator within the video display 22, to fetch data from memory 14 by way of the data bus DB. This data is then supplied to the video display control circuit where it may be buffered to provide video patterns representative of the data characters for display on the cathode ray tube.

Figure 2:
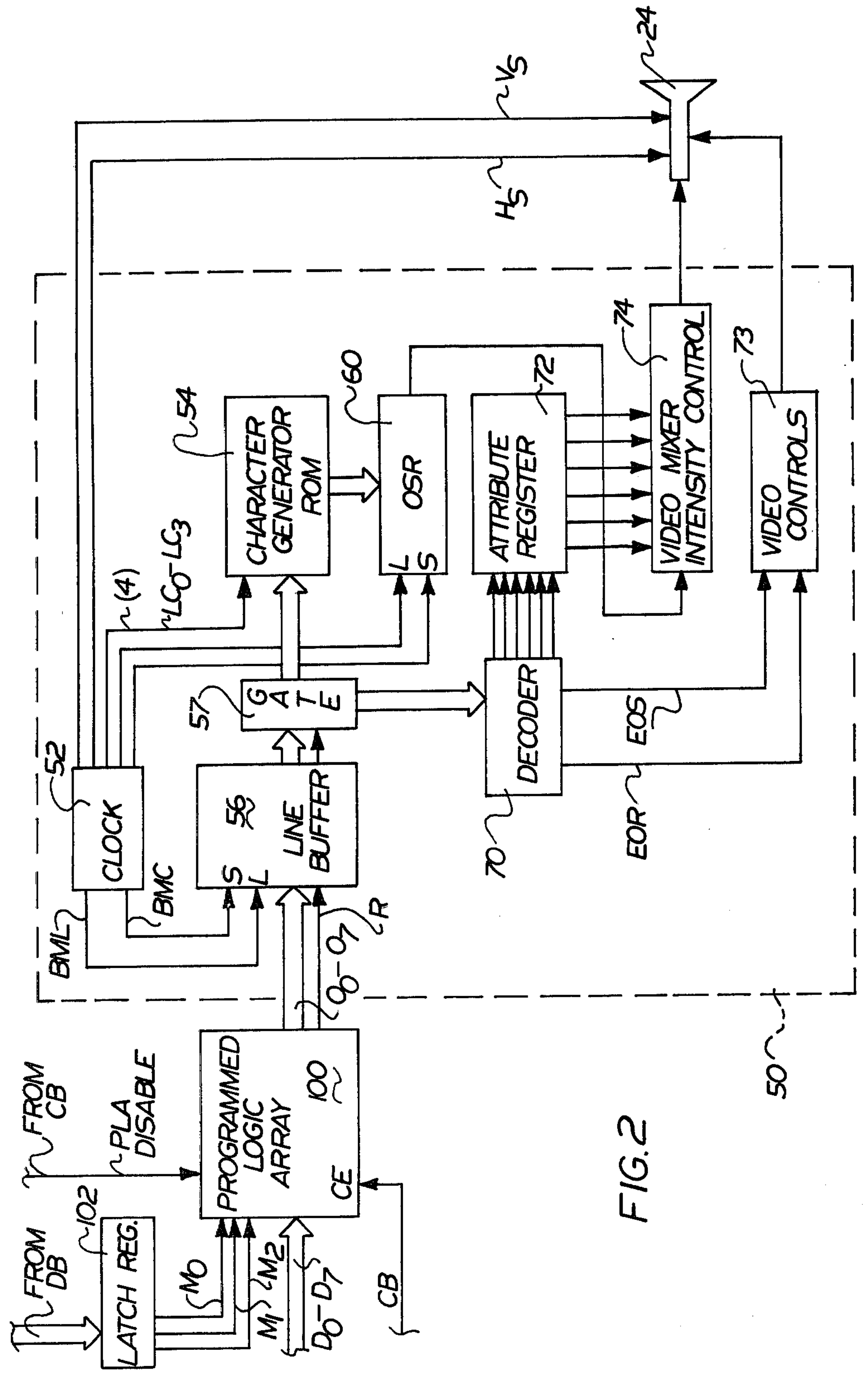
FIG. 2 is a schematic-block diagram illustration showing in greater detail the video display circuitry employed in conjunction with the present invention.

Reference is now made to FIG. 2 which illustrates the video display circuit in greater detail. This circuit employs a character generator 50 which utilizes a TV type raster scan, the scanning of which is controlled by horizontal and vertical synchronizing signals $H_S$ and $V_S$ provided by a suitable timing and control circuit, sometimes referred to hereinafter as clock circuit 52. In this type of display, each horizontal scan line generates a linear segment or "stroke" of each of the characters being displayed at that vertical position on the screen. Character generator 50 serves to control the generation of alphanumeric characters for display on the face of the cathode ray tube 24. In a conventional fashion, a read only memory 54 stores a font of dot patterns for the various characters and symbols to be displayed by the cathode ray tube 24. Each character is displayable within a 9×16 dot matrix pattern. The address for addressing a dot pattern stored in mamory 54 is obtained from the coded characters supplied to the data bus DB by memory 14. These coded characters may be first buffered, as with a line buffer 56, so that a line of coded characters corresponding with a line of characters to be displayed are stored in buffer 56. These data characters may be loaded a character at a time in synchronism with buffer memory load pulses BML supplied to the load input of the buffer 56 and then, once a line has been loaded, outputted a character at a time in synchronism with buffer memory clock pulses BMC also obtained from clock 52 and supplied to the shift input of buffer 56. Optionally, the coded data characters may be supplied directly to the character generator ROM 54.

Memory 54 stores a font of dot patterns of the various characters and symbols to be displayed by the cathode ray tube 24. Each dot character or symbol is displayable within a character field, such as a 9×16 dot matrix. The dot character itself may take up only a 7×9 dot matrix pattern, however, the additional dots are required for intercharacter and interline spaces and descending characters. The address for addressing a dot pattern stored in memory 54 is obtained from the line buffer 56 and from a four line coded line count $LC_0$-$LC_3$ obtained from the video control and timing circuit 52. During the generation of a line of characters with a TV raster scan, each scan lays down one slice or dot pattern segment for each of the characters on a line. Succeeding scans provide the remaining slices or dot segments. Consequently, then, for a 9×16 dot character field, sixteen scan lines may be required. This means that for each character generated, the memory 54 must be addressed at least sixteen times for the potential sixteen dot segments and this line of data characters in the line buffer will be recirculated at least sixteen times and the count provided by the line count data will be incremented with each circulation. The address, then, for each dot pattern is a combination of the line count together with the character code obtained from line buffer 56.

Each time a line segment dot pattern is outputted from memory 54, it appears as a bit pattern which is loaded in parallel into an output shift register 60 when that register receives a load signal from clock 52. The dot pattern is shifted in bit serial fashion out of the output shift register in synchronism with shift or clock pulses supplied to the shift input of the register 60 from clock 52. As is conventional, the dot pattern segments control the blanking-unblanking operation of the cathode ray tube. As the beam is being scanned horizontally across the screen, a dot pattern is displayed with each line segment being in accordance with the associated bit pattern outputted from register 60. At the end of a scan line there will be an interval which may be considered as the horizontal blanking interval and it is during this interval that a horizontal synchronization signal $H_S$ is provided by the timing control circuit 52. This, in a conventional fashion, causes the beam to flyback or retrace to its original location where the beam is automatically incremented downwardly by one scan line in a position to commence tracing of a second scan line across the face of the cathode ray tube. The scans will continue through a character line, which, in the embodiment being described, will require sixteen scan lines. The number of visible character lines in a vertical direction will be determined in large measure by the size of the cathode ray tube. In the example being given, that may be on the order of sixteen character lines, each requiring sixteen scan lines. A vertical blanking interval will occur at the bottom of the screen for approximately 30 scan lines and it is during this interval that a vertical synchronization signal $V_s$ is generated by the control and timing circuit 52. This causes the beam to flyback to its home position, normally located in the upper left-hand corner of the cathode ray tube.

The data stream outputted from the line buffer 56 includes eight bit coded data words. As previously discussed, these coded data words, in the embodiment being described fall into one of three categories, character codes, control codes or attributes. As previously discussed, the control codes are special commands which specify signal conditions such as last character in a character row, EOR, or the last character on a screen EOS (these are sometimes referred to as the end of line character or the end of frame character). Such characters may be decoded as by a decoder 70 which supplies commands indicative of end of row EOR, or end of screen EOS, to a video control circuit 72 which controls the cathode ray tube so that in the case of an end of row command initiation may be had to turn off the beam for the rest of the row or in the case of an end of screen command that initiation may be had to turn off the beam for the rest of the screen.

Other coded words may be indicative of attribute codes. These are codes which define a special condition in a field of characters following the attribute code. These might include, for example, that the characters following this attribute code have one or more video attributes such as underline attribute (UL), reverse video attribute (RVV), character blink (BLK) or high intensity (HGLT). Other attributes, of course, may be had. Assigning each of these to a different bit position in the coded word permits a decoder such as decoder 70 to supply the correct logic commands to an attribute register 72 so as to raise the proper attribute line to a video mixer and intensity control circuit 74. As is conventional in the art, such a control circuit would then modify the bit stream being outputted from the output shift register 60 in accordance with the attribute to be invoked prior to the bit stream being supplied to the intensity control of the cathode ray tube 24.

The description thus far has been given with respect to a relatively conventional processor driven terminal, sometimes known as an intelligent terminal. Such a terminal may be employed to access data stored at a host computer and displayed as on a cathode ray tube. The manipulation of data within the terminal is under processor control pursuant to instruction sets stored within the processor as well as those stored in the read only memory 12. Additional instruction sets may be downloaded, as desired, from the host computer HC and stored in the random access memory 14. Such terminals are used in various applications requiring data processing and such applications may include editing of text and the like. Video display terminals having structures other than that as described thus far may also be employed in practicing the present invention.

Figure 3A:
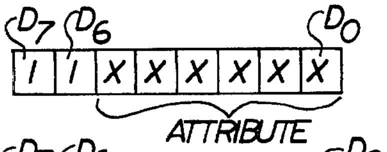
FIGS. 3A, 3B and 3C illustrate data words which describe three different codes which is useful in describing the present invention.
Figure 3B:
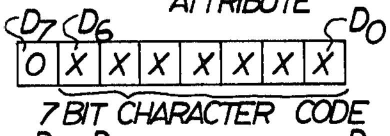
Figure 3C:
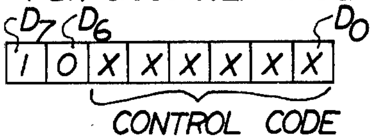

Reference is now made to FIGS. 3A, 3B and 3C. Each is representative of an eight bit coded word outputted from the data bus to the video display circuitry 22 (FIG. 1). The most significant bit $D_7$ is shown on the far left and the least significant bit $D_0$ is shown to the far right. With respect to the coded word illustrated in FIG. 3A, the two most significant bits each have a binary 1 condition and this is indicative of coded word defining one or more attributes in the six least significant bit positions. With reference to FIG. 3B, it is seen that the most significant bit $D_7$ is at a binary 0 level. This indicates that the coded word is representative of a character leaving seven bits to be used to define the character. As is known, these seven bits then will provide 128 different character codes. Reference is now made to FIG. 3C which shows that the most significant bit position is at a binary 1 level whereas the next most significant bit position is at a binary 0 level. In the example being given this indicates that the coded word is a control code and the least significant bits may be used to provide six different control commands. This is the type of data normally outputted from a data source of the video display control circuitry. If no control code or attributes were used, then all eight bits of the character code could be used to define characters, permitting 256 available character codes. However, many video display systems such as the one disclosed herein may require that the data source provide control codes as well as attribute codes. Since at least one bit position must be dedicated to indicate whether the coded word is a character code or some other code, then this leaves only seven bits available for a character code, thereby limiting such a system to 128 character codes. Thus, even though memory 54 may be capable of storing far more than 128 different dot patterns, the system is only capable of addressing 128 of them. Consequently, in such a terminal, the font of characters is limited to 128 characters. In many systems this limitation is a severe handicap and it would be desirable to provide a font of far more characters. This would require a more complex system, perhaps abandoning an eight bit system such as that disclosed and providing a sixteen bit system in order to achieve a greater font capability.

In accordance with the present invention, a programmable logic array 100 (FIG. 2) is interposed between the data source and the character generator circuitry 50. The programmable logic array serves to convert the eight bit coded data words $D_0$–$D_7$ to eight bit output data words $O_0$–$O_7$ where the outputted bit pattern may be the same as or different from the data ($D_0$–$D_7$) that was inputted. The bit pattern that is outputted will be determined by the manner in which programmable logic array has been programmed. For example, certain data words which are indicative of either attributes or control characters may be changed in their meaning by the logic array so as to appear as character codes, thereby increasing the font capability from 128 characters to something approaching 256 characters in an eight bit system. Preferably, as will be described in greater detail hereinafter, the logic array is programmed so that in MODE 0 there will be a total 188 available character codes, instead of a normal 128, two control codes and six attributes. This alone will enchance or increase the capability of such an eight bit system as that described so as to achieve a far greater font capability than that known heretofore. Additionally, there are seven other modes in the preferred embodiment and they provide other combinations of available character codes, attributes or commands.

Again, referring to FIG. 2, the programmed logic array converts, in MODE 0, the multi-bit coded data words $D_0$–$D_7$ to multi-bit data words $O_0$–$O_7$, such that 188 of the bit patterns are available for character codes. Additionally, the programmed logic array may receive other inputs such as the three inputs indicated as $M_0$, $M_1$, and $M_2$, under program control from the processor as by way of a latch register 102 which receives inputs from the data bus. These add sufficient inputs so as to provide a total of eight combinations (one being used as the MODE 0 combination referred to above). Another input that may be obtained from the control bus CB is a disable input which disables the programmed logic array 100 so that the outputted multi-bit data words $O_0$–$O_7$ are unchanged in the bit pattern from their data words obtained from the data bus.

Figure 4:
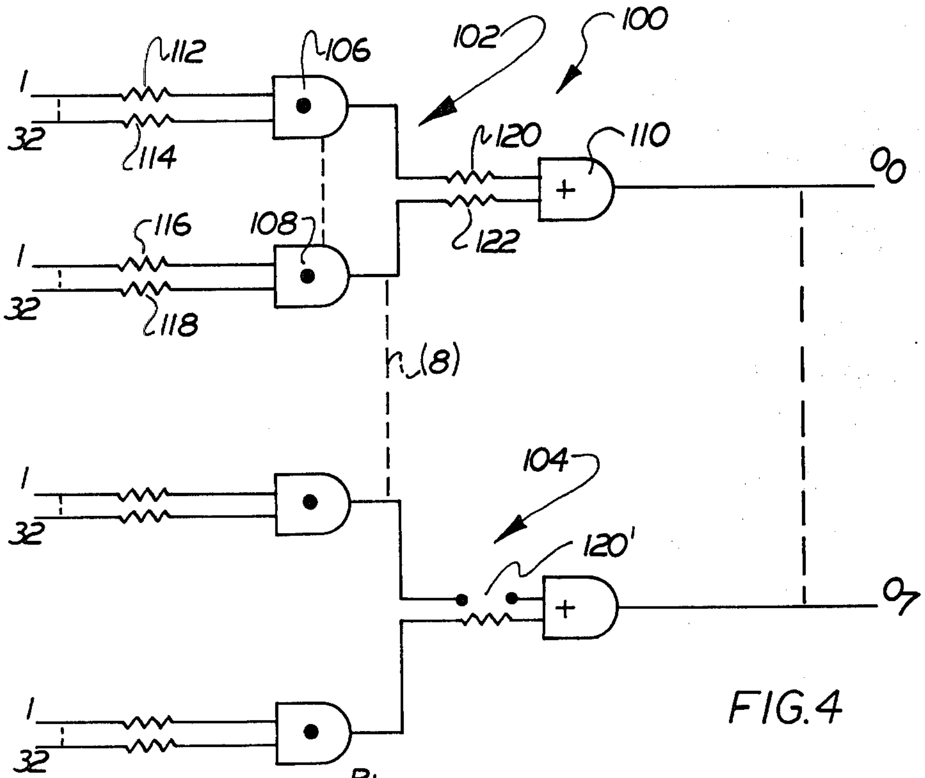
FIG. 4 is a schematic-block diagram illustration of circuitry employed in the present invention.
Figure 5:
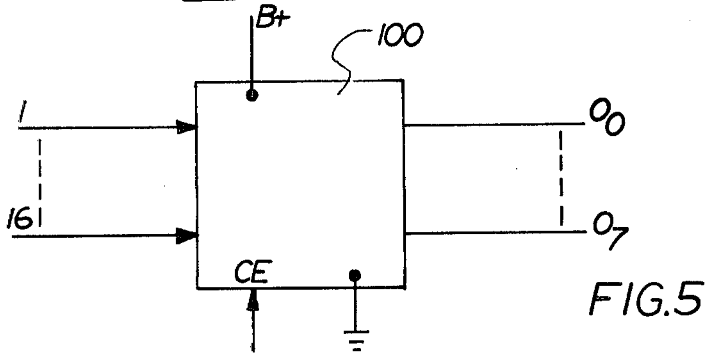
FIG. 5 is a block diagram illustration of the circuitry illustrated in FIG. 4.

Before describing the modes in any greater detail, reference is now made to FIG. 4 which illustrates the circuitry employed in the logic array 100. Although other forms may be employed, this logic array preferably takes the form such as that provided by Signetics Corporation and known as their PLA model 82S100. The pin connections take the form as shown in FIG. 5, this being a sixteen bit input device and is activated upon receiving a chip enable signal and requires a DC power input on the order of +5 volts. The chip enable signal may be obtained as from the control bus CB on a signal outputted under program control by the processor 10. Basically, the circuitry takes the form similar to the simplified version thereof of FIG. 4. This includes a plurality of logic circuits of which two are illustrated as circuits 102 and 104. These are identical and each includes a plurality of logic gates such as AND gates 106 and 108 having their outputs supplied to an OR gate 110. Interposed between the inputs and the AND gates 106 and 108 there are provided a plurality of fuses such as fuses 112, 114, 116 and 118. Additionally, between the outputs of AND gates 106 and 108 and OR gate 110 there are provided fuses 120 and 122. The programmability is obtained by destroying one or more of these fuses in order to achieve a desired output bit pattern at outputs $O_0$–$O_7$. Each fuse preferably takes the form of a nichrome-titanium fuse. These are programmed by destroying selected fuses, preferably by supplying a high current level. As an example, fuse 120' in circuit 104 is illustrated as being blown so as to provide an open circuit. As shown in FIG. 5, the logic array is a sixteen bit input device. With reference to FIG. 2, then, it is seen that eight bits may be obtained from the data bus and three bits may be obtained from the latch register and a twelfth bit may be obtained from the PLA disable input. This leaves four unused inputs in the embodiment being described herein. Internally of the program logic array, each of the inputs is converted into either true and false versions so that sixteen inputs and 32 signals are obtained. This pattern, then, of 32 input signals is supplied to each of the AND gates 106, 108, etc. and the bit pattern being outputted as an eight bit pattern $O_0$–$O_7$ will be determined by the nature of the binary levels of all of the input signals together with the manner in which logic array has been programmed (i.e., destroying one or more fuses).

Preferably the program logic array is programmed so that when the PLA disable input is high, the logic array will pass the bit pattern $D_0$–$D_7$ without change. As discussed hereinbefore, the mode 0 condition will cause a change in the meaning of the inputted data word. The mode 0 is one of the eight conditions designated by the mode inputs $M_0$, $M_1$ and $M_2$. Reference is now made to Table I below.

TABLE I

| | D7 | | | | | | | DO |
|---|---|---|---|---|---|---|---|---|
| MODE 0: | | | | | | | | |
| Attributes | 1 | 1 | UL | RVV | G1 | GO | BLINK | HGLT |
| Control Codes | 1 | 0 | 1 | 1 | 0 | 0 | C | C |
| Characters | 188 available codes | | | | | | | |
| MODE 1: | | | | | | | | |
| Attributes | 1 | 1 | 1 | RVV | UL | GO | BLINK | HGLT |
| Control Codes | NONE | | | | | | | |
| Characters | 224 available codes | | | | | | | |
| MODE 2: | | | | | | | | |
| Attributes | NONE | | | | | | | |
| Control Codes | 1 | 0 | 1 | 1 | 0 | 0 | C | C |
| Characters | 252 available codes | | | | | | | |
| MODE 3: | | | | | | | | |
| Attributes | 1 | 1 | 1 | A3 | A2 | GO | A1 | G1 |
| Control Codes | NONE | | | | | | | |
| Characters | 224 available characters | | | | | | | |
| MODE 4: | | | | | | | | |
| Attributes | 1 | 1 | UL | RVV | G1 | GO | BLINK | HGLT |
| Control Codes | NONE | | | | | | | |
| Characters | 192 Character Codes | | | | | | | |
| MODE 5: | | | | | | | | |
| Attributes | 1 | 1 | 1 | RVV | UL | GO | BLINK | HGLT |
| Control Codes | 1 | 0 | 1 | 1 | O | O | C | C |
| Characters | 220 available characters | | | | | | | |
| MODE 6: | | | | | | | | |
| Attributes | NONE | | | | | | | |
| Control Codes | NONE | | | | | | | |
| Characters | 256 characters | | | | | | | |
| MODE 7: | | | | | | | | |
| Attributes | 1 | 1 | 1 | A3 | A2 | GO | A1 | G1 |
| Control Codes | NONE | | | | | | | |
| Characters | 224 character codes | | | | | | | |

The eight possible conditions obtained with mode lines $M_0$, $M_1$ and $M_2$ are reflected in Table I as modes 0 through mode 7. Thus the program logic array is additionally programmed so that upon receipt of mode signals indicative of one of these modes, the meaning of the coded data word will be changed so as to provide output bit pattern having the capabilities as indicated in the Table. But, before describing the Table in greater detail, some definition of terms used in the Table should be made:

UL=underline attribute
RVV=reverse video attribute
G1=general purpose attribute
G0=general purpose attribute
Blink=character blink
HGLT=high intensity
C=a control code
A1–A3=nonvisual attributes It may be apparent that mode 7 and mode 3 appear identical. However, it is contemplated that in such different modes all lower case letters will be converted to upper case in mode 7 so that only the upper case letters are displayed. In considering these different modes, attention may now be directed to mode 0 from which it is seen that the character codes have been expanded from 128 available codes to 188 available codes. The explanation for this may be as follows. Since an eight bit code would provide 256 available codes, then this will be degraded by the extent to which some of the bit positions are dedicated. In mode 0, an attribute code has all six of the least significant bit positions dedicated to six different attributes. Thus, this degrades the available code by 64. Additionally, in this mode the two least significant bit positions are dedicated to control codes, further degrading the available codes by 4. This, then, in total has degraded the available codes by 4 plus 64 or 68. Subtracting this from the 256 available codes leaves 188 codes which are available for character codes, as opposed to the normal 128 codes. Consequently, 60 additional available codes not dedicated to either attributes or control codes can be used to expand the available character codes. In mode 0 the logic array is programmed so as to make use of these additional 60 codes for characters. This is achieved by correctly programming the logic array as by blowing various fuses. With reference to Table 1, modes 1-7 provide additional variations in the numbers of codes that are available for character codes, control codes, or attribute codes. The explanation given above with respect to mode 0 applies to determine the number of codes which are available for characters.

Reverting again to FIG. 2, logic array 100 has an output R which serves, when high, to indicate that the eight bit word on outputs $O_0$–$O_7$ represents a character code, otherwise it represents either an attribute code or a control code. This "bit" forms a nine bit word in buffer 56 and is separated out and used as a gate control signal to gate 57. When output R is high it causes gate 57 to pass the associated eight bit word to ROM 54 so as to provide an eight bit address to obtain a character stroke pattern. Otherwise, the eight bit words are supplied to decoder 70.

In summation, it is seen that the programmed logic array 100 will in mode 0 convert a coded word so as to increase the number of codes that are available for character codes. As the bit pattern on mode input lines $M_0$, $M_1$ and $M_2$ is varied under program control, additional variations in the numbers of available codes for characters or other purposes may be accomplished as in the case of the various modes illustrated in Table 1. It is seen, then, that the use of such a program logic array has the effect of providing greater flexibility, so that for example, an eight bit system such as that disclosed may operate as if it were a larger system, while maintaining the economies of an eight system.

Although the invention has been described in conjunction with the preferred embodiment, it is to be appreciated that various modifications may be made within the spirit and scope of the invention as defined by the appended claims.

What is claimed is:

1. A video display system, comprising:

a data source for providing a data stream comprised of a plurality of multi-bit coded data words, each said data word being comprised of N bits and having at least one dedicated bit position for normally indicating whether the data word is representative of a character to be displayed or a non-character, whereby a maximum of N−1 bits can be used to provide character information;

video display means for displaying images of characters represented by character data words;

character generator means for receiving said data words for controlling said video display means in dependence upon non-character data words for displaying images of said character data words; and, conversion means interposed between said data source and said character generator means for converting the bit patterns of at least some of said data words normally representing said non-character data words into that representing character data words to thereby increase the number of said data words available to represent characters to be displayed.

2. A video display system as set forth in claim 1 wherein said conversion means has R modes for converting said non-character data words R different ways.

3. A video display system as set forth in claim 2, wherein said R modes are selectable, means for providing coded selection data words to said conversion means wherein each said coded selection data word represents one of said R different modes, said conversion means being responsive to a said selection data word for operating in a selected mode in dependence thereon.

4. A video display terminal as set forth in claim 3, wherein said conversion means is programmed to convert the bit patterns of said non-character data words in one of R different ways in dependence upon the mode selected by said coded selection data word.

5. A video display terminal as set forth in claim 4, wherein said non-character data words include video control commands, and means responsive thereto for controlling the operation of said display means.

6. A video display terminal as set forth in claim 5, wherein said non-character data words include video attribute commands and means responsive thereto for effecting a video attribute to the video display.

7. A video display terminal as set forth in claim 4, wherein said conversion means includes a programmed logic array.

* * * * *